US007728047B2

(12) United States Patent
Notari et al.

(10) Patent No.: US 7,728,047 B2
(45) Date of Patent: Jun. 1, 2010

(54) PROCESS FOR THE RECYCLING OF EXPANDED POLYSTYRENE

(75) Inventors: Marcello Notari, Parma (IT); Franco Rivetti, Milan (IT); Maurizio Ghirardini, Milan (IT); Sergio Lombardini, Milan (IT)

(73) Assignee: Polimeri Europa S.p.A., Brindisi (IT)

( * ) Notice: Subject to any disclaimer, the term of this patent is extended or adjusted under 35 U.S.C. 154(b) by 0 days.

(21) Appl. No.: 11/996,075

(22) PCT Filed: Jun. 28, 2006

(86) PCT No.: PCT/EP2006/006247

§ 371 (c)(1), (2), (4) Date: Mar. 7, 2008

(87) PCT Pub. No.: WO2007/009559

PCT Pub. Date: Jan. 25, 2007

(65) Prior Publication Data

US 2008/0221228 A1 Sep. 11, 2008

(30) Foreign Application Priority Data

Jul. 22, 2005 (IT) .......................... MI2005A1409

(51) Int. Cl.
*C08J 11/04* (2006.01)

(52) U.S. Cl. .......................... 521/44; 521/40; 521/40.5; 521/43.5; 528/480; 528/486; 528/489; 528/491; 528/495

(58) Field of Classification Search ................... 521/40, 521/40.5, 47, 48, 79, 134, 50, 41, 48.5, 42, 521/43.5, 44; 528/196, 480, 486, 489, 491, 528/495; 264/50, 53
See application file for complete search history.

(56) References Cited

U.S. PATENT DOCUMENTS

2003/0036576 A1* 2/2003 Nishimoto et al. ............ 521/50

FOREIGN PATENT DOCUMENTS

| | | |
|---|---|---|
| EP | 1 275 686 | 1/2003 |
| JP | 11 5865 | 1/1999 |
| JP | 11 080418 | 3/1999 |
| WO | 95 09196 | 4/1995 |
| WO | 02 38659 | 5/2002 |
| WO | 2005 023922 | 3/2005 |

OTHER PUBLICATIONS

Rodriguez, A. et al., "Vapour-Liquid Equilibria of Dimethyl Carbonate With Linear Alcohols and Estimation of Interaction Parameters for the UNIFAC ANS ASOG Method", Fluid Phase Equilibria, vol. 201, pp. 187-201 (2002).

* cited by examiner

*Primary Examiner*—Ling-Siu Choi
*Assistant Examiner*—Frances Tischler
(74) *Attorney, Agent, or Firm*—Oblon, Spivak, McClelland, Maier & Neustadt, L.L.P.

(57) ABSTRACT

The invention relates to an enhanced process for the recycling of expanded polystyrene. Said process essentially comprises the reduction in volume of expanded polystyrene by means of dissolution in a solvent, separation of the insoluble components, selective precipitation of the polystyrene with an anti-solvent, separation, drying and extrusion of the precipitated polystyrene, recovery by distillation and recycling of the solvent. The process is characterized in that the anti-solvent is a butanol selected form n-butanol, iso-butanol or sec-butanol and the solvent is dimethyl carbonate, alone or in a mixture containing up to 25% by weight of butanol.

20 Claims, No Drawings

PROCESS FOR THE RECYCLING OF EXPANDED POLYSTYRENE

The present invention relates to an enhanced process for the recycling of expanded polystyrene.

More in particular, it relates to a process comprising the reduction in volume of expanded polystyrene by means of dissolution in a solvent, separation of the insoluble components, the selective precipitation of polystyrene with an anti-solvent, the separation, drying and extrusion of the precipitated polystyrene, recovery by distillation and recycling of the solvent.

Expanded polystyrene is used in large quantities, due to its low heat conductivity and good shock-resistance, as a packaging material for various products and as a heat insulating material for buildings and refrigerators. The waste products deriving from these materials and the production waste of expanded polystyrene, as its specific weight is very low, are extremely voluminous and consequently its transportation and subsequent disposal in dumps are a problem.

Disposal by incineration of these waste materials, on the other hand, is a also problem, as it can interfere in the combustion process of the incinerator and can also cause the production of toxic gases.

Some types of expanded polystyrene, in fact, which contain brominated flame-retardant additives, can, when incinerated, cause the formation of extremely toxic polybrominated dioxins. For these reasons, waste products from expanded polystyrene should be recycled, in a first phase reducing the volume and subsequently regenerating the polystyrene.

The conventional methods for volume reduction and the recycling of polystyrene, which include thermo-mechanical compacting treatment, do not allow the polystyrene to be separated from the other products present in the expanded polystyrene, and they also have the considerable disadvantage of causing the oxidative partial degradation of the polymer, thus reducing its quality (Kano, Suzuki, J. Jpn. Pack. Inst., 31, 33, 1993; Sasao, Harade et Al., Kagaku Kogyo, 66, 395 1992).

Another method for reducing the volume of and recycling expanded polystyrene described in the known art, which overcomes the above drawbacks, includes the dissolution of the polymer in an organic solvent.

The recovery of the polystyrene from the solution is then effected by solvent evaporation, or by precipitation by the addition of water or an anti-solvent.

These type of processes described in the known art, however, also have several drawbacks, which jeopardize their industrial application, among which:

- the use of toxic and dangerous solvents for human beings and the environment, as in the case of the use of aromatic or organo-halogenated compounds
- instability and variability of the characteristics, quality, market availability and price; unacceptable organoleptic characteristics, as in the case of the use of limonene as solvent
- insufficient or zero removal of the additives contained in the material to be treated, followed by poor quality of the recovered polystyrene, as in the case of recovery by evaporation from the solution or the precipitation obtained by the addition of water or scarcely selective organic anti-solvents such as saturated hydrocarbons. Examples of additives which should be separated from polystyrene are brominated flame-retardant additives, such as, for example, hexabromocyclododecane (HBCD) and coadjuvants of flame-retardant additives, such as, for example, dicumylperoxide (DCP). These additives must be removed from polystyrene in order to avoid the formation of toxic gases, the degradation and colouring of the polymer during the subsequent extrusion phase
- difficulty in recovery and drying, followed by the poor quality of the recovered polystyrene, as in the case of recovery by evaporation from high-boiling solvents or precipitation from solvents with a low volatility such as alkylene glycols
- difficulty in solubilization (low rate of dissolution and low concentration or high viscosity of the solution), as in the case of the use of solvents with a low volatility such as dibasic esters, glycol ethers and esters
- difficulty in fractionating the solvent/anti-solvent mixture after the recovery of the polystyrene and difficulty in recycling the solvent in the polystyrene dissolution step. In particular, as the anti-solvent is normally used in a large excess (up to 10-15 times by weight with respect to the solvent), processes are particularly jeopardized, which, by using high-boiling solvents and more volatile anti-solvents, require, during the separation step by distillation of the solvent/anti-solvent mixture, the distillation of the whole anti-solvent contained in the mix, so as to allow the solvent to be recycled to the styrene dissolution step, with an enormous energy consumption and economical burden for the process, which makes industrial application undesirable.

In order to overcome these drawbacks and develop processes which can be applied on an industrial scale, solvent/anti-solvent systems have been studied, having improved characteristics with respect to those described in the known art.

Japanese patent applications JP 11-005 865, JP 11-080 418 and the international patent application WO 2005/023922, for example, describe the excellent properties as solvents, with respect to expanded polystyrene, of alkyl carbonates, in general.

Patent applications JP 11-080 418, DE 10207336, U.S. Pat. No. 5,232,954 and WO 2005/023922 describe the optimum properties as anti-solvents of low-boiling alcohols, in general. These alcohols are characterized by being non-solvents for polystyrene and good solvents of the additives contained in the polystyrene itself, so as to allow the selective precipitation of pure polystyrene and its separation from the additives which remain in solution.

A process based on the use of a particular combination of a solvent and an anti-solvent has now been found, which allows a good-quality expanded polystyrene to be recovered, without difficulty in fractionating the solvent/anti-solvent mix and without any difficulty in recycling the solvent to the polystyrene dissolution step.

In accordance with this, an object of the present invention relates to a process for the recovery of polystyrene from waste material containing expanded polystyrene essentially comprising:

i. the reduction in volume of expanded polystyrene by means of dissolution in a solvent;
ii. separation of the insoluble components;
iii. precipitation of the polystyrene solution by means of an anti-solvent;
iv. separation, washing and drying of the precipitated polystyrene;
v. fractionation by distillation of the components of the mother liquor used for the precipitation and washing, recovery of the solvent from the head of the distillation column and its recycling to step i), recovery of the anti-solvent from the bottom of the distillation column, characterized in that the anti-solvent is a butanol selected from n-butanol, iso-butanol or sec-butanol and the solvent is dimethyl carbonate, alone or in a mixture containing up to 25% by weight of butanol.

The particular utility of the use of dimethyl carbonate as solvent, in combination with butanol as anti-solvent, should be considered as quite surprising.

It was, in fact, known that dimethyl carbonate forms with low-boiling alcohols containing from 1 to 4 carbon atoms, azeotropic mixtures with a minimum boiling point, of difficult resolution, as described, for example, in Rodriguez et al., FLUID PHASE EQUILIBRIA 201, 187-201, 2002. It was also legitimate to expect that these mixtures would not be good solvents for polystyrene, due to the presence of the alcohol having known anti-solvent characteristics. This does in fact occur and has been demonstrated by the inventors in the case of azeotropic mixtures of dimethyl carbonate with methyl, ethyl, n-propyl, iso-propyl and tert-butyl alcohol.

It is also surprising that a mixture containing dimethyl carbonate and up to 25% by weight of butanol, also allows the reduction in volume and dissolution of expanded polystyrene at room temperature in very short times and the easy production of solutions with a high concentration of polymer, under conditions and with results practically comparable with those obtained through the use of dimethyl carbonate alone, and better than those obtained with the use of other alkyl carbonates.

It should be pointed out that the use of dimethyl carbonate (or the mixture containing dimethyl carbonate and butanol in the above-mentioned proportions) as solvent and butanol as anti-solvent, according to the invention, is essential for an easy recovery of the solvent by distillation from the mother liquor used for the precipitation and washing of polystyrene, after the separation of the latter, without the necessity of having to effect the distillation of the anti-solvent added in large excess to obtain the precipitation of the polystyrene.

The use of dimethyl carbonate as solvent, and low-boiling alcohols not conforming to the invention, such as methanol, ethanol, propanol, isopropanol or tert-butanol, as anti-solvents, would require costly and uneconomical separation operations of the components of the azeotropic mixture to recover the dimethyl carbonate.

The use of higher carbonates such as diethyl carbonate, dipropyl carbonate or dibutyl carbonate, would, in turn, not only significantly jeopardize the dissolution rate of the polystyrene, which would be slower, but would also necessitate, in the separation phase by distillation of the solvent-anti-solvent mixture, the distillation of the whole anti-solvent contained in the mixture to allow the solvent to be recycled to the polystyrene dissolution step, with an enormous energy consumption and economical burden for the process, making it undesirable to be used on an industrial scale.

The process, object of the invention has numerous advantages with respect to the processes of the known art, in all the steps in which it is articulated.

Dimethyl carbonate and butanol are stable compounds, they are inexpensive, widely available in industrial practice, have a moderate flammability and have favourable toxicological and eco-toxicological properties.

The reduction in volume and dissolution of expanded polystyrene in the solvent takes place at room temperature in extremely rapid times and solutions are obtained with a high concentration of the polymer and with a moderate viscosity, which facilitates the separation operation of the insoluble fraction, for example by filtration.

The solvent used in the reduction in volume and dissolution of the expanded polystyrene can be easily recovered by distillation of the mother liquor used for the precipitation and washing of the polystyrene, after separation of the latter, without the necessity of having to distil the anti-solvent added in a large excess to obtain the precipitation of the polystyrene, with a consequent considerable energy and cost saving.

The use of butanol as anti-solvent for the precipitation of the polystyrene from the solvent guarantees a high removal selectivity of the additives and easy separation and drying under moderate vacuum and temperature conditions of polystyrene, with a consequent high quality of the polymer recovered, which can be subjected to subsequent extrusion without colouring and without a decrease in the molecular weight.

By operating according to an embodiment of the invention, the solvent in which the reduction in volume and dissolution of the expanded polystyrene is effected, additionally contains a saturated aliphatic or cyclic hydrocarbon having a number of carbon atoms equal to or lower than 7, or a mixture of said hydrocarbons, at a concentration ranging from 0.1 to 35% by weight in the mixture. This hydrocarbon normally contains 5 carbon atoms and is introduced into the process by the waste material containing expanded polystyrene, object of the treatment, representing the residue of the expanding agent used still contained therein. The expanding agent residue is normally contained in the waste material containing expanded polystyrene, object of the treatment, at a concentration varying from 0.1 to 1.5% by weight.

It is surprising that, when operating according to the above embodiment of the invention, the solvent mix containing dimethyl carbonate (or dimethyl carbonate and butanol in the proportions indicated above) and additionally a saturated aliphatic or cyclic hydrocarbon, allows the reduction in volume and dissolution of expanded polystyrene at room temperature in extremely rapid times and the easy production of solutions with a high concentration of polymer, under conditions and with results completely comparable with and even better than those obtained in the absence of said hydrocarbons. It is in fact known that, similarly and in addition to alcohols, said saturated aliphatic or cyclic hydrocarbons are also anti-solvents which precipitate the polystyrene from its solutions, as described for example in international patent application WO 2003/35729.

It should be pointed out once more that, when the expanded polystyrene to be recycled contains a saturated aliphatic or cyclic hydrocarbon such as pentane, as residue of the expanding agent used, normally at a concentration varying from 0.1 to 1.5% by weight, which is accumulated in the process streams following their recycling, the use of the solvent mix containing dimethyl carbonate (or dimethyl carbonate and butanol in the proportions indicated above) and additionally the saturated aliphatic or cyclic hydrocarbon at a concentration ranging from 0.1 to 35% by weight in the mixture, allows the entity of the process purge streams to be minimized with a considerable benefit with respect to its handling and cost in the light of its use on an industrial scale.

The material to be treated can be any waste material containing expanded polystyrene, such as, for example, waste from industrial production before use, scraps of cutters and transformers, waste from packaging obtained from urban differentiated waste collection, expanded polystyrene from agricultural applications (seed-trays) etc. The material to be treated can also contain, and normally does contain, one or more of the usual additives, such as plasticizers, antioxidants, stabilizers, dyes and, in particular, flame-retardant additives such as brominated flame-retardants, for example hexabromocyclododecane (HBCD) and coadjuvants of flame-retardant additives, for example dicumylperoxide (DCP). The material to be treated may also have been subjected to a previous mechanical compression operation until a density is reached, for example, of about 0.1 Kg/l.

By operating according to the invention, the dissolution of expanded polystyrene is effected at atmospheric pressure, in an apparatus preferably equipped with a stirrer, at a temperature normally ranging from 20° C. to 70° C.

The concentration of polystyrene in the solution ranges from 5% to 50% by weight, preferably within the range of 15% to 40% by weight.

According to an embodiment of the invention, the dissolution is preceded, if necessary, by the cutting of the material to be treated, containing expanded polystyrene, according to conventional techniques, for example by means of rotating knives, into pieces of blocks having maximum dimensions normally ranging from 0.1 to 100 cm, preferably from 1 to 50 cm.

The insoluble components possibly present, are separated from the polystyrene solution, by means of conventional solid/liquid separation methods, such as, for example, decanting, filtration and centrifugation.

The precipitation of polystyrene is effected at a temperature ranging from 10° C. to 70° C., preferably within the range of 15° C. to 50° C. The quantity of anti-solvent used is in the weight ratio with the solvent ranging from 2:1 to 20:1, preferably within the range of 5:1 to 15:1.

The precipitation of polystyrene is preferably carried out by feeding the polystyrene solution to the anti-solvent maintained under turbulent stirring. The feeding of the polystyrene solution is preferably effected on the bottom of the precipitation reactor, below the stirring system, with a flow-rate which has no relevant influence on the process, and which is within the range of 50 to 8,000, expressed as g/(hour*liter of non-solvent). The turbulent stirring during the polystyrene precipitation phase, allows a solid precipitate to be obtained, avoiding the formation of gel and minimizing the inclusion of solvent and additives in the precipitate. By operating in this way, a precipitate is obtained having an average particle size of 30 μm (microns).

The polystyrene precipitate is separated by means of conventional methods, such as decanting, centrifugation or filtration, preferably filtration. This operation is effected at a temperature ranging from 10 to 70° C., preferably from 15 to 50° C. The solid separated is washed using the anti-solvent adopted for the precipitation. The washing is effected at a temperature ranging from 10 to 80° C., preferably from 15 to 70° C., by pouring the washing liquid onto the filter containing the solid matter; or by suspending the solid in the washing liquid, leaving the suspension under stirring for a period of 1 to 24 hours and then separating the solid by decanting, centrifugation or filtration; or by an extraction in continuous, using an extractor, for example, of the Soxhlet type. The amount of washing fluid used ranges from 3 to 20 liters per Kg of solid product, preferably from 5 to 10 liters per Kg of solid product.

The polymer is dried at a temperature ranging from 50 to 180° C., preferably from 80 to 150° C., and at a pressure of 760 to 10 mm Hg, preferably from 50 to 500 mm Hg.

The dried polymer is extruded with extruders of common use.

For the separation of the solvent from the anti-solvent, the liquid coming from the polystyrene separation and the washing liquid are mixed together and undergo distillation according to traditional methods, normally at atmospheric pressure, recovering dimethyl carbonate (or a mixture of dimethyl carbonate and butanol in the above-mentioned proportions) which represents the solvent, from the head of the distillation column, and which is recycled to the polystyrene dissolution step, and the anti-solvent (butanol) from the bottom of the column, which is recycled to the polystyrene precipitation step.

The head stream removed from the distillation column in addition to dimethyl carbonate (or a mixture of dimethyl carbonate and butanol in the above-mentioned proportions) can additionally contain a saturated aliphatic or cyclic hydrocarbon, having a number of carbon atoms equal to or lower than 7, or a mix of said hydrocarbons. This hydrocarbon normally contains 5 carbon atoms and it is introduced into the process by the waste material containing expanded polystyrene object of the treatment, representing the residue of the expanding agent used still contained therein.

The residue of expanding agent is normally contained in the waste material containing expanded polystyrene object of the treatment, at a concentration ranging from 0.1 to 1.5% by weight. In this case, a purging stream is removed from the head stream, before recycling to the polystyrene dissolution step, in a quantity suitable for maintaining in the recycled stream, a concentration of hydrocarbon, or mixture of hydrocarbons, ranging from 0.1 to 35% by weight. The purging stream can be suitably treated using conventional techniques, for example by means of further distillation, for the recovery of the hydrocarbon, which is disposed of, whereas the dimethyl carbonate (and possible butanol) contained therein is recovered and recycled to the process.

The bottom stream recovered from the bottom of the distillation column is treated for the separation of possible additives, which can be recovered or disposed of.

The method described allows the recovery of polystyrene without altering its properties, as it enables undesired additives to be separated from the polymer.

The examples provided hereunder are for illustrative and non-limiting purposes of the present invention.

The expanded polystyrene used in the examples is of the flame-retardant type, characterized by a weight average molecular weight of 200,000, by a bromine content of 0.545% and a dicumylperoxide content of 0.19%.

EXAMPLE 1

In this example, the solubilization capability of expanded polystyrene by dimethyl carbonate was evaluated.

A cube of expanded polystyrene having a volume of 125 $cm^3$ (length=5 cm, width=5 cm, depth=5 cm) is immersed in a beaker containing 20 ml of solvent, at room temperature, and the time necessary for the polystyrene to completely dissolve, is measured.

The polystyrene proves to be completely dissolved in about 45 seconds.

EXAMPLE 2

Example 1 is repeated using a mixture containing dimethyl carbonate and n-butanol in a weight ratio of 90:10.

The polystyrene proves to be completely dissolved in about 75 seconds.

EXAMPLE 3

Example 1 is repeated using an azeotropic mixture containing dimethyl carbonate and iso-butanol (weight ratio 92:8).

The polystyrene proves to be completely dissolved in about 68 seconds.

EXAMPLE 4

Example 1 is repeated using an azeotropic mixture containing dimethyl carbonate and sec-butanol (weight ratio 85:15).

The polystyrene proves to be completely dissolved in about 103 seconds.

EXAMPLE 5

Example 1 is repeated using a mixture containing dimethyl carbonate and n-pentane in a weight ratio of 95:5.

The polystyrene proves to be completely dissolved in about 40 seconds.

EXAMPLE 6

Example 1 is repeated using a mixture containing dimethyl carbonate and n-pentane in a weight ratio of 90:10.

The polystyrene proves to be completely dissolved in about 46 seconds.

EXAMPLE 7

Example 1 is repeated using a mixture containing dimethyl carbonate, n-butanol and n-pentane in a weight ratio of 80:10:10.

The polystyrene proves to be completely dissolved in about 75 seconds.

EXAMPLES 8-14 (COMPARATIVE)

Example 1 is repeated using different mixtures of the known art. The results are shown in table 1.

TABLE 1

| Example | Solvent | Solubilization time (sec.) |
|---|---|---|
| 8 | di-ethyl carbonate | about 110 |
| 9 | di-n-propyl carbonate | about 180 |
| 10 | di-n-butyl carbonate | about 290 |
| 11 | diethylene glycol dimethyl ether | about 165 |
| 12 | limonene | about 290 |
| 13 | dimethyl succinate | about 440 |
| 14 | dimethyl adipate | about 580 |

EXAMPLES 15-19 (COMPARATIVE)

Example 1 is repeated using the following azeotropic mixtures:

| | | |
|---|---|---|
| ex. 15 | dimethyl carbonate/ethanol | (55/45 by weight) |
| ex. 16 | dimethyl carbonate/n-propanol | (75/25 by weight) |
| ex. 17 | dimethyl carbonate/isopropanol | (44/56 by weight) |
| ex. 18 | dimethyl carbonate/methanol | (30/70 by weight) |
| ex. 19 | dimethyl carbonate/tert-butanol | (33/67 by weight) |

In examples 15, 16 and 17, the expanded polystyrene proves to be reduced in volume (collapsed), but not dissolved after 30 minutes. In examples 18 and 19 the expanded polystyrene is neither reduced in volume nor dissolved after 30 minutes.

EXAMPLE 20

210 g of dimethyl carbonate are introduced into a glass container having a volume of 0.5 liters, equipped with a blade stirrer, thermometer, bottom discharge and an inlet for the addition of material. 90 g of crushed expanded polystyrene are added, in aliquots, to the solvent mixture, maintained under stirring at room temperature, and the whole mixture is left under stirring until complete dissolution.

The solution obtained, containing 30% by weight of polystyrene, is filtered to eliminate insoluble extraneous substances.

The equipment used for the polystyrene precipitation consists of a jacketed glass reactor, having a volume of 1 liter, equipped with a water condenser, thermometer, bottom discharge, Ultra-Turrax stirrer-homogeniser and feeding plunged pipe, whose form and dimensions are such that the polystyrene solution can be fed below the stirring system.

300 g of n-butanol are charged into the reactor described above, and are kept at a temperature of about 25° C. by the circulation of tap water in the reactor jacket. Stirring is started (4,000 rev/min) and 50 g of the polystyrene solution are fed through the plunged pipe, by means of a gear pump, at a flow-rate of 100 g/hour.

During this phase, the polystyrene precipitates in the form of a flaky solid. Once the feeding of the polymer solution has been completed, the solid formed is filtered.

The liquid filtered, having a weight of 290 g, has the following composition:

11.8% by weight of dimethyl carbonate, 88.17% by weight of butanol, 139 mg/kg of bromine and 57 mg/kg of dicumylperoxide.

The solid on the filter is washed, at room temperature, with 200 g of n-butanol. The washing liquid having a weight of 221.6 g has the following composition:

0.32% by weight of dimethyl carbonate, 99.68% by weight of butanol, 39 mg/kg of bromine and 27.5 mg/kg of dicumylperoxide.

The solid on the filter, having a weight of 38.4 g, has the following composition:

38.8% by weight of polystyrene, 61.2% by weight of butanol, 857 mg/kg of bromine and 148 mg/kg of dicumylperoxide.

The solid product, after drying in an oven for 4 hours at a temperature of 120° C. and a pressure of about 50 mbar, has a weight of 14.94 g and the following composition:

99.76% by weight of polystyrene, 2,200 mg/kg of bromine and 380 mg/kg of dicumylperoxide.

The contents of bromine and dicumylperoxide in the polystyrene recovered were reduced by 59.7% and 80% respectively, with respect to the starting expanded polystyrene.

The polystyrene recovered is white and has a weight average molecular weight, through GPC, equal to that of the starting polystyrene.

The filtration liquid and the washing liquid are joined and distilled. The liquid to be distilled, having a weight of 511.7 g, has the following composition:

6.84% by weight of dimethyl carbonate, 93.14% by weight of butanol, 160 mg/kg of bromine and 56 mg/kg of dicumylperoxide.

The equipment used for the distillation consists of the following parts:

Jacketed glass flask having a volume of 1 liter, equipped with a housing for a thermocouple and heated by a circulating oil thermostatic bath.

Glass distillation column, jacketed and electrically traced in order to minimize the heat dispersions, one meter long and with an internal diameter of 20 mm, equipped with a Sulzer DX filler. It was experimentally determined that, at atmospheric pressure, this column has about 20 theoretical steps.

Glass distillation head, equipped with a condenser and housing for a thermocouple, wherein the whole vapour is condensed and an aliquot of the liquid is removed at the reflux ratio established by the intervention of an electromagnetic valve. The liquid removed is collected in a jacketed container of 100 millilitres.

The mix to be distilled is charged into the flask and is heated with oil to the boiling temperature. After about one hour from the beginning of the heating, the temperature of the vapour at the head of the column stabilizes at a value of 90.1° C., whereas that of the column bottom stabilizes at 117.5° C. The head condensate is removed with a reflux ratio of 10:2, until the temperature at the head remains constant. 17 g of distilled product having a DMC content higher than 99.9% are collected over a period of about 40 minutes.

Subsequently, operating under the same conditions and in about 10 minutes, 11.4 g of distillate are collected (column head temperature=90.3° C.), having the following composition:

99.4% by weight of dimethyl carbonate and 0.6% by weight of butanol.

The reflux ratio is increased to 10:1, as the temperature at the head of the column increases rapidly, and the distillate is collected until the head temperature reaches a value of 117.6° C. The fraction of distillate collected, weighing 19 g, has the following composition:

34% by weight of dimethyl carbonate and 66% by weight of butanol. The head temperature subsequently stabilizes at a value of 117.8° C. and, maintaining the reflux rate at 10:1, 27 g of distillate having the following composition are collected:

99.2% by weight of butanol and 0.8% by weight of dimethyl carbonate.

The product at the bottom of the column, having a weight of 437.3 g, has a butanol content higher than 99.9%.

EXAMPLE 21

350 g of n-butanol are poured into the reactor described in example 20 and are maintained at a temperature of about 50° C., by the circulation of ethylene glycol in the reactor jacket, heated by a thermostatic bath. The stirring is started (4,000 rev/minute) and 50 g of the polystyrene solution (30% by weight in dimethyl carbonate) are fed from the plunged pipe, by means of a gear pump, with a flow-rate of 3,000 g/hour.

The polystyrene precipitates during this phase. Once the feeding of the polymer solution has been completed, the solid formed is filtered. The filtered liquid, having a weight of 364 g, has the following composition:

9.15% by weight of dimethyl carbonate, 90.8% by weight of butanol, 165 mg/Kg of bromine and 59 mg/Kg of dicumylperoxide. The solid on the filter is washed, at room temperature, with 100 g of n-butanol. The washing liquid, having a weight of 117 g, has the following composition: 1.47% by weight of dimethyl carbonate, 98.53% by weight of butanol, 35 mg/Kg of bromine and 45 mg/Kg of dicumylperoxide.

The solid on the filter, having a weight of 19 g, has the following composition:

78.4% by weight of polystyrene, 21.4% by weight of butanol, 0.17% by weight of dimethyl carbonate, 925 mg/Kg of bromine and 78.5 mg/Kg of dicumylperoxide.

The solid, after drying in an oven for a period of 4 hours, at a temperature of 120° C. and a pressure of about 50 mbar, has a weight of 14.92 g and the following composition:

99.87% by weight of polystyrene, 0.0067% by weight of butanol, 1,180 mg/Kg of bromine and 99.8 mg/Kg of dicumylperoxide.

The contents of bromine and dicumylperoxide in the polystyrene recovered were reduced by 79% and 94.8%, respectively, with respect to the starting expanded polystyrene.

The polystyrene recovered is white and has a weight average molecular weight, determined by GPC, equal to the starting polystyrene.

The filtration liquid and the washing liquid are joined and distilled as described in example 20.

EXAMPLE 22

210 g of a mixture containing 189 g of dimethyl carbonate (90% by weight) and 21 g of n-butanol (10% by weight) are charged into a glass container having a volume of 0.5 liters, equipped with a blade stirrer, thermometer, bottom discharge and inlet for the addition of material. 90 g of crushed expanded polystyrene are added, in aliquots, to the solvent mix, maintained under stirring at room temperature, and the whole mixture is left under stirring until complete dissolution.

The solution obtained, containing 30% by weight of polystyrene, is filtered to eliminate insoluble extraneous substances.

350 g of n-butanol are poured into the reactor described in example 20, and are maintained at a temperature of about 25° C. by the circulation of tap water in the reactor jacket. The stirring is started (4,000 rev/minute) and 50 g of the polystyrene solution are fed from the plunged pipe, by means of a gear pump, at a flow-rate of 3,000 g/hour.

The polystyrene precipitates during this phase, in the form of a flaky solid. Once the feeding of the polymer solution has been completed, the solid formed is filtered. The liquid filtered, having a weight of 310 g, has the following composition:

8.95% by weight of dimethyl carbonate, 91% by weight of butanol, 145 mg/kg of bromine and 52 mg/kg of dicumylperoxide.

The solid on the filter is washed, at room temperature, with 100 g of n-butanol. The washing liquid having a weight of 166.95 g has the following composition:

2.04% by weight of dimethyl carbonate, 97.95% by weight of butanol, 42 mg/kg of bromine and 37.4 mg/kg of dicumylperoxide.

The solid on the filter, having a weight of 23 g, has the following composition:

64.8% by weight of polystyrene, 33.7% by weight of butanol, 1.49% by weight of dimethyl carbonate, 1,300 mg/kg of bromine and 250 mg/kg of dicumylperoxide.

The solid product, after drying in an oven for 4 hours at a temperature of 120° C. and a pressure of about 50 mbar, has a weight of 14.92 g and the following composition:

99.86% by weight of polystyrene, 2000 mg/kg of bromine and 385 mg/kg of dicumylperoxide.

The contents of bromine and dicumylperoxide in the polystyrene recovered were reduced by 63.1% and 79.6% respectively, with respect to the starting expanded polystyrene.

The polystyrene recovered is white and has a weight average molecular weight, determined by GPC, equal to that of the starting polystyrene.

The filtration liquid and the washing liquid are joined and distilled, as described in Example 20.

EXAMPLE 23

350 g of n-butanol are poured into the reactor described in example 20, and are maintained at a temperature of about 50° C. by the circulation of ethylene glycol in the reactor jacket. The stirring is started (4,000 rev/minute) and 50 g of the polystyrene solution prepared in Example 22 (30% by weight in the dimethyl carbonate/n-butanol mixture 90-10 by weight) are fed from the plunged pipe, by means of a gear pump, at a flow-rate of 3,000 g/hour.

The polystyrene precipitates during this phase. Once the feeding of the polymer solution has been completed, the solid formed is filtered. The liquid filtered, having a weight of 360 g, has the following composition:

8.36% by weight of dimethyl carbonate, 91.63% by weight of butanol, 184 mg/kg of bromine and 66 mg/kg of dicumylperoxide.

The solid on the filter is washed, at room temperature, with 100 g of n-butanol. The washing liquid having a weight of 119.3 g has the following composition:

1.13% by weight of dimethyl carbonate, 98.86% by weight of butanol, 17 mg/kg of bromine and 27 mg/kg of dicumylperoxide.

The solid on the filter, having a weight of 20.7 g, has the following composition:

72% by weight of polystyrene, 27.75% by weight of butanol, 0.18% by weight of dimethyl carbonate, 637 mg/kg of bromine and 75.5 mg/kg of dicumylperoxide.

The solid product, after drying in an oven for 4 hours at a temperature of 120° C. and a pressure of about 50 mbar, has a weight of 14.92 g and the following composition:

99.86% by weight of polystyrene, 0.007% by weight of butanol, 884 mg/kg of bromine and 105 mg/kg of dicumylperoxide.

The contents of bromine and dicumylperoxide in the polystyrene recovered were reduced by 83.8% and 94.5% respectively, with respect to the starting expanded polystyrene.

The polystyrene recovered is white and has a weight average molecular weight, determined by GPC, equal to that of the starting polystyrene.

The filtration liquid and the washing liquid are joined and distilled, as described in Example 20.

The invention claimed is:

1. A process for the recovery of polystyrene from a waste material comprising expanded polystyrene, said process comprising:

i. reducing a volume of said expanded polystyrene by dissolution of said expanded polystyrene in a solvent, thereby obtaining a solution;

ii. separating an insoluble component from said solution;

iii. precipitating polystyrene from said solution by mixing an anti-solvent, to obtain precipitated polystyrene;

iv. separating, washing and drying of the precipitated polystyrene;

v. fractionating, by distillation, of components of a mother liquor used for the precipitation and washing, recovering of the solvent from a head of a distillation column and recycling of said solvent to step i), and recovering of the anti-solvent from a bottom of the distillation column;

wherein the anti-solvent is a butanol selected from the group consisting of n-butanol, iso-butanol and sec-butanol; and wherein the solvent is dimethyl carbonate in a mixture containing up to 25% by weight of butanol, said butanol being present.

2. The process according to claim 1, wherein the solvent in which the volume reduction and dissolution of the expanded polystyrene is carried out, further comprises 0.1 to 35% by weight of an aliphatic or cyclic saturated hydrocarbon, with a number of carbon atoms equal to or lower than 7, or a mixture of said hydrocarbons.

3. The process according to claim 2, wherein the aliphatic or cyclic saturated hydrocarbon comes from expanded polystyrene to be recycled, in which said hydrocarbon is contained in a concentration ranging from 0.1 to 1.5% by weight.

4. The process according to claim 3, wherein the aliphatic or cyclic saturated hydrocarbon contains 5 carbon atoms.

5. The process according to claim 4, wherein the aliphatic or cyclic saturated hydrocarbon is n-pentane.

6. The process according to claim 1, wherein the waste material further comprises one or more additives.

7. The process according to claim 6, wherein the additives is hexabromocyclododecane (HBCD) and/or dicumylperoxide (DCP).

8. The process according to claim 1, wherein the waste material is subjected to a preventive mechanical compacting operation.

9. The process according to claim 8, wherein the mechanical compacting is effected until a density of the waste material in the order of 0.1 kg/l is reached.

10. The process according to claim 1, wherein the dissolution of the expanded polystyrene is carried out at atmospheric pressure, in an apparatus equipped with a stirrer, at a temperature ranging from 20° C. to 70° C.

11. The process according to claim 1, wherein a concentration of polystyrene in the solution ranges from 5% by weight to 50% by weight.

12. The process according to claim 11, wherein the concentration of polystyrene in the solution ranges from 15% by weight to 40% by weight.

13. The process according to claim 1, wherein the precipitation of polystyrene is carried out at a temperature ranging from 10° C. to 70° C.

14. The process according to claim 13, wherein the precipitation of polystyrene is carried out at a temperature ranging from 15° C. to 50° C.

15. The process according to claim 1, wherein the precipitation from the solution of polystyrene is carried out with a quantity of anti-solvent ranging from 2:1 to 20:1 in a weight ratio with the solvent.

16. The process according to claim 15, wherein the precipitation is carried out with a quantity of anti-solvent ranging from 5:1 to 15:1 in the weight ratio with the solvent.

17. The process according to claim 1, wherein the precipitation of polystyrene is carried out by feeding the solution of polystyrene to the anti-solvent, kept under turbulent stirring, below a stirring system.

18. The process according to claim 1, wherein the separation of the precipitated polystyrene is effected at a temperature ranging from 10° C. to 70° C.

19. The process according to claim 1, wherein the separation of the precipitated polystyrene is effected at a temperature ranging from 15° C. to 50° C.

20. The process according to claim 1, wherein the solvent used in the reduction in volume and dissolution of the expanded polystyrene is recovered by distillation of the mother liquor used for the precipitation and washing of the polystyrene, without distillation of the anti-solvent added to obtain the precipitation of the polystyrene.

* * * * *